US010811701B2

(12) United States Patent
Heo et al.

(10) Patent No.: US 10,811,701 B2
(45) Date of Patent: Oct. 20, 2020

(54) FUEL CELL STACK

(71) Applicants: Hyundai Motor Company, Seoul (KR); Kia Motors Corporation, Seoul (KR)

(72) Inventors: Seong Il Heo, Gyeonggi-Do (KR); Byeong-Heon Jeong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 114 days.

(21) Appl. No.: 16/000,162

(22) Filed: Jun. 5, 2018

(65) Prior Publication Data

US 2019/0198893 A1 Jun. 27, 2019

(30) Foreign Application Priority Data

Dec. 27, 2017 (KR) .......................... 10-2017-0180699

(51) Int. Cl.
*H01M 8/02* (2016.01)
*H01M 8/026* (2016.01)
*H01M 8/0267* (2016.01)
*H01M 8/04* (2016.01)
*H01M 8/04029* (2016.01)

(52) U.S. Cl.
CPC ......... *H01M 8/0267* (2013.01); *H01M 8/026* (2013.01); *H01M 8/04029* (2013.01)

(58) Field of Classification Search
CPC ...... H01M 8/02; H01M 8/0267; H01M 8/026; H01M 8/04; H01M 8/12
See application file for complete search history.

(56) References Cited

U.S. PATENT DOCUMENTS

2006/0046117 A1\* 3/2006 Suh ........................ H01M 8/026
  429/434
2006/0046125 A1\* 3/2006 Lai ....................... H01M 8/0267
  429/514

FOREIGN PATENT DOCUMENTS

JP      2009059513 A  *  3/2009
JP      5139753 B2       2/2013

OTHER PUBLICATIONS

Machine Translation of: JP 2009-059513A, Ishida et al., Mar. 19, 2009.*

\* cited by examiner

*Primary Examiner* — Kenneth J Douyette
(74) *Attorney, Agent, or Firm* — Mintz Levin Cohn Ferris Glovsky and Popeo, P.C.; Peter F. Corless

(57) ABSTRACT

A fuel cell stack is provided to improve the flow of cooling water and reactant gas. The fuel cell stack includes a cooling water diffusion portion provided on each of the anode separator and the cathode separator. A first cooling water flow path area is provided between a land formed on the cooling water diffusion portion of the anode separator and a channel formed on the cooling water diffusion portion of the cathode separator. A second cooling water flow path area is provided between a channel formed on the cooling water diffusion portion of the anode separator and a land formed on the cooling water diffusion portion of the cathode separator. In addition, the first cooling water flow path area and the second cooling water flow path area are parallel with each other within at least a part of the cooling water diffusion portions.

10 Claims, 6 Drawing Sheets

Cooling Water

FUEL CELL STACK

CROSS REFERENCE TO RELATED APPLICATION

The present application claims priority to Korean Patent Application No. 10-2017-0180699, filed Dec. 27, 2017, the entire contents of which is incorporated herein for all purposes by this reference.

BACKGROUND

Field of the Invention

The present invention relates generally to a fuel cell stack, and more particularly, to a fuel cell stack that improves flow of cooling water and reactant gas.

Description of the Related Art

A fuel cell refers to a generator that converts chemical energy of a fuel into electrochemical energy. Fuel cells are used to supply driving power for industrial purposes, household purposes, and vehicles, and to power small electronic products such as portable devices. Recently, the range of use for fuel cells has been gradually expanded to a highly efficient and clean energy source.

FIG. 1 shows a configuration of a general fuel cell stack of the related art. As shown in FIG. 1, in the general fuel cell stack, a membrane-electrode assembly (MEA) is disposed on an innermost side of the fuel cell stack, the MEA 110 including a polymer electrolyte membrane 111 for moving protons, and an anode 112 and a cathode 113, which are catalyst layers applied on each surface of the polymer electrolyte membrane, whereby hydrogen and oxygen react thereon.

In addition, a gas diffusion layer (GDL) 120 is laminated on an outer portion of the MEA 110, where the anode 112 and the cathode 113 are disposed. Separators 130a and 130b having a flow field supplying a fuel and discharging water generated by the reaction are disposed an outer portion of the GDL 120 with a gasket 140 interposed therebetween. An end plate 200 that supports and fixes the above-described components are coupled to an outermost side of the fuel cell stack. In the anode 112 of the fuel cell stack, oxidation reaction of hydrogen proceeds, whereby protons and electrons are generated. The generated protons and electrons are moved to the cathode 113 through the polymer electrolyte membrane 111 and wires. In the cathode 113, water is generated through an electrochemical reaction in which protons and electrons moved from the anode 112 and oxygen in the air react, and at the same time, electrical energy is generated from a flow of electrons.

In general, the separators 130a and 130b are manufactured in a structure in which a land for support and a channel (flow field) for flow of fluids are configured to be repeated. A general separator is configured in a structure in which the land and the channel (flow field) are configured to be curved repeatedly. In other words, a channel facing the GDL 120 is used as a space for flow of the reactant gas such as hydrogen or air, and at the same time, an opposite channel is used as a space for flow of cooling water, and thus, a unit cell may include a total of two separators, one separator having a hydrogen/cooling water channel and one separator having an air/cooling water channel.

Meanwhile, FIGS. 2 and 3 show separators according to a related art. In a separator 10 according to the related art, inlet manifolds 10a, 10b, and 10c for introducing the reactant gas and the cooling water and outlet manifolds (not shown) for discharging the reactant gas and the cooling water are formed at both edges of the separator 10. For example, as shown in FIG. 2, a first side of the separator includes a hydrogen inlet manifold 10a, a cooling water inlet manifold 10b, and an air inlet manifold 10c each introducing hydrogen, the cooling water, and air (oxygen). In addition, yet not shown in FIG. 2, a second side of the separator 10 (e.g., an opposite side to the first side) includes a hydrogen outlet manifold, a cooling water outlet manifold, and an air outlet manifold each discharging hydrogen, the cooling water, and air (oxygen). The separator 10 includes a reaction surface that corresponds to the GDL 120 and connects to the inlet manifolds 10a, 10b, and 10c configured at the first side of the separator 10 and the outlet manifolds (not shown) configured at the second side of the separator 10. Furthermore, each diffusion portion is disposed between the respective inlet manifold 10a, 10b, and 10c and the reaction surface to diffuse and supply the hydrogen, the cooling water, and the air (oxygen) introduced from the inlet manifolds 10a, 10b, and 10c respectively to the reaction surface. Reference 10d shown in FIG. 2 refers to a cooling water diffusion portion diffusing the cooling water.

As shown in FIG. 3, the cooling water diffusion portion 10d applied to the separator 10 according to the related art includes a stepped portion 13 for moving the coolant to respective cooling water channel 11 to diffuse and supply the cooling water introduced from the cooling water inlet manifold 10b to the cooling water channels 11 provided on the reaction surface. In particular, the stepped portion 13 includes a plurality of channels to be lower than a depth of the cooling water channel 11 and the coolant moves to a space configured by the stepped portion 13, thereby diffusing to the respective cooling water channel 11. However, in general, the depth of the cooling water channel 11 is 0.3 mm to 0.5 mm and the depth of the stepped portion 13 is 0.1 mm to 0.2 mm. Since there is no substantial difference therebetween, it is difficult to precisely shape the stepped portion 13 and control the quality of the stepped portion 13. When a height of the stepped portion 13 is not ensured or non-uniform, a deviation occurs in the distribution of the cooling water, which causes a deterioration in an efficiency of the fuel cell.

SUMMARY

Accordingly, the present invention provides a fuel cell stack capable of efficiently distributing cooling water without forming a stepped portion in a channel of the cooling water, thereby improving flow of the cooling water and reactant gas.

According to one aspect of the present invention, a fuel cell stack in which cooling water flows to a space defined by an anode separator and a cathode separator facing each other in adjacent cells may include: a cooling water diffusion portion disposed on each of the anode separator and the cathode separator to introduce the cooling water from a cooling water manifold by distributing the cooling water on a reaction surface; a first cooling water flow path area disposed between a land formed on the cooling water diffusion portion of the anode separator and a channel formed on the cooling water diffusion portion of the cathode separator; and a second cooling water flow path area disposed between a channel formed on the cooling water diffusion portion of the anode separator and a land formed on the cooling water diffusion portion of the cathode separator. The first cooling water flow path area and the second cooling water flow path area may be parallel with each other within at least a part of the cooling water diffusion portions.

The land formed on the cooling water diffusion portion of the anode separator and the channel formed on the cooling water diffusion portion of the cathode separator may be grooved in a same direction while being spaced apart from each other at facing positions. The channel formed on the cooling water diffusion portion of the anode separator and the land formed on the cooling water diffusion portion of the cathode separator may be grooved in a same direction while being spaced apart from each other at facing positions.

The width of each of the lands formed on the respective cooling water diffusion portions of the anode separator and the cathode separator may be greater than a width of an associated one of the channels formed on the respective cooling water diffusion portions of the anode separator and the cathode separator. A width of a land formed on the cooling water diffusion portion of the anode separator and a width of a land formed on the cooling water diffusion portion of the cathode separator may be equal to each other, and a width of the channel formed on the cooling water diffusion portion of the anode separator and a width of the channel formed on the cooling water diffusion portion of the cathode separator may be equal to each other.

The land and the channel formed on the cooling water diffusion portion of the anode separator and the land and the channel formed on the cooling water diffusion portion of the cathode separator may be parallel with each other in a direction perpendicular to a direction of a shortest distance between the cooling water manifold and the reaction surface. A hydrogen channel area provided by the channel of the anode separator and an air channel area provided by the channel of the cathode separator may be parallel with the first cooling water flow path area and the second cooling water flow path area within a region where the first cooling water flow path area and the second cooling water flow path area are parallel with each other.

A region where the first cooling water flow path area and the second cooling water flow path area are parallel with each other may be disposed near the cooling water manifold. The anode separator and the cathode separator may remain separated (e.g. no contact) at a region where the first cooling water flow path area and the second cooling water flow path area are disposed. The cooling water flowing toward the reaction surface from the cooling water manifold may flow to the first cooling water flow path area and the second cooling water flow path area from the cooling water manifold in a longitudinal direction of the anode separator and the cathode separator.

Unlike a related art, since a channel is provided on a separator without a stepped portion for flow of cooling water in an exemplary embodiment of the present invention, a defect of the channel during the formation of the separator may be prevented. In addition, by disposing the lands and channels of the anode separator and the lands and channels of the cathode separator to face each other in the adjacent fuel cell cells, the cooling water flows to a space between the lands and the channels, thereby improving the flow of the cooling water and reaction gas without requiring the stepped portion.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
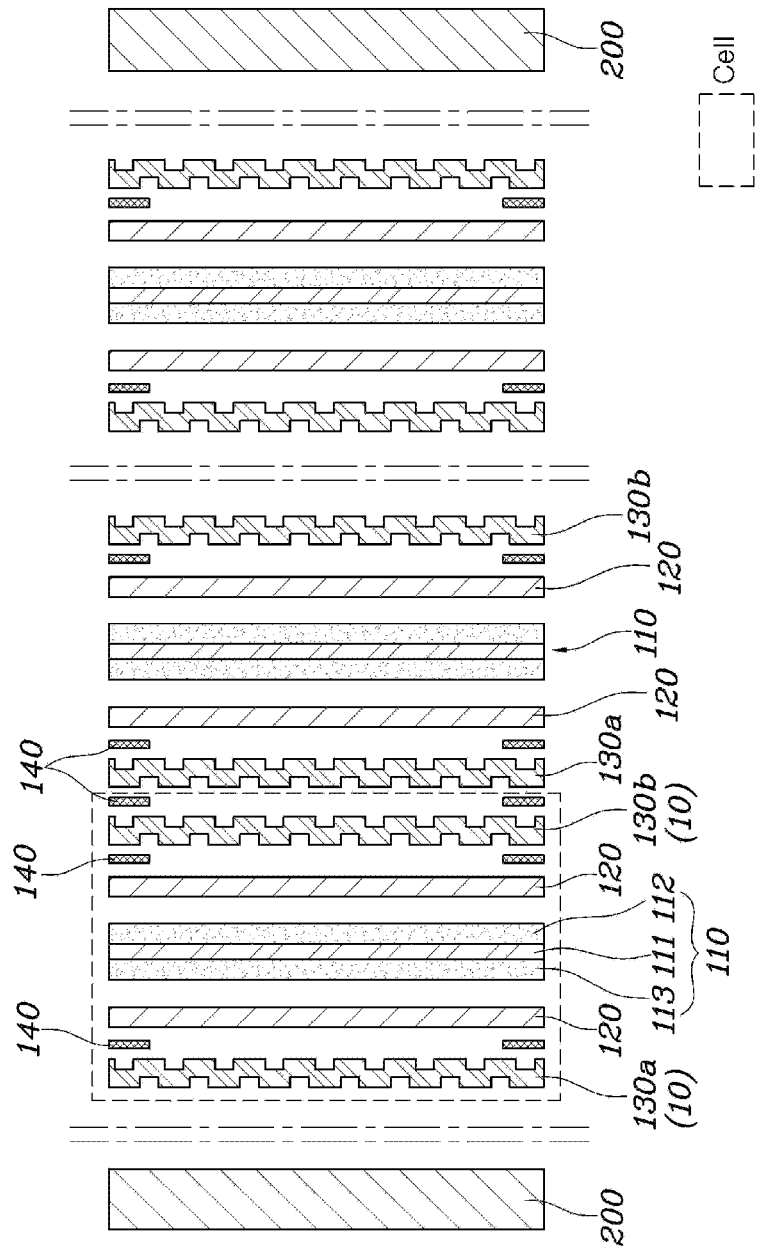
FIG. 1 shows a configuration of a general fuel cell stack according to the related art.
Figure 2:
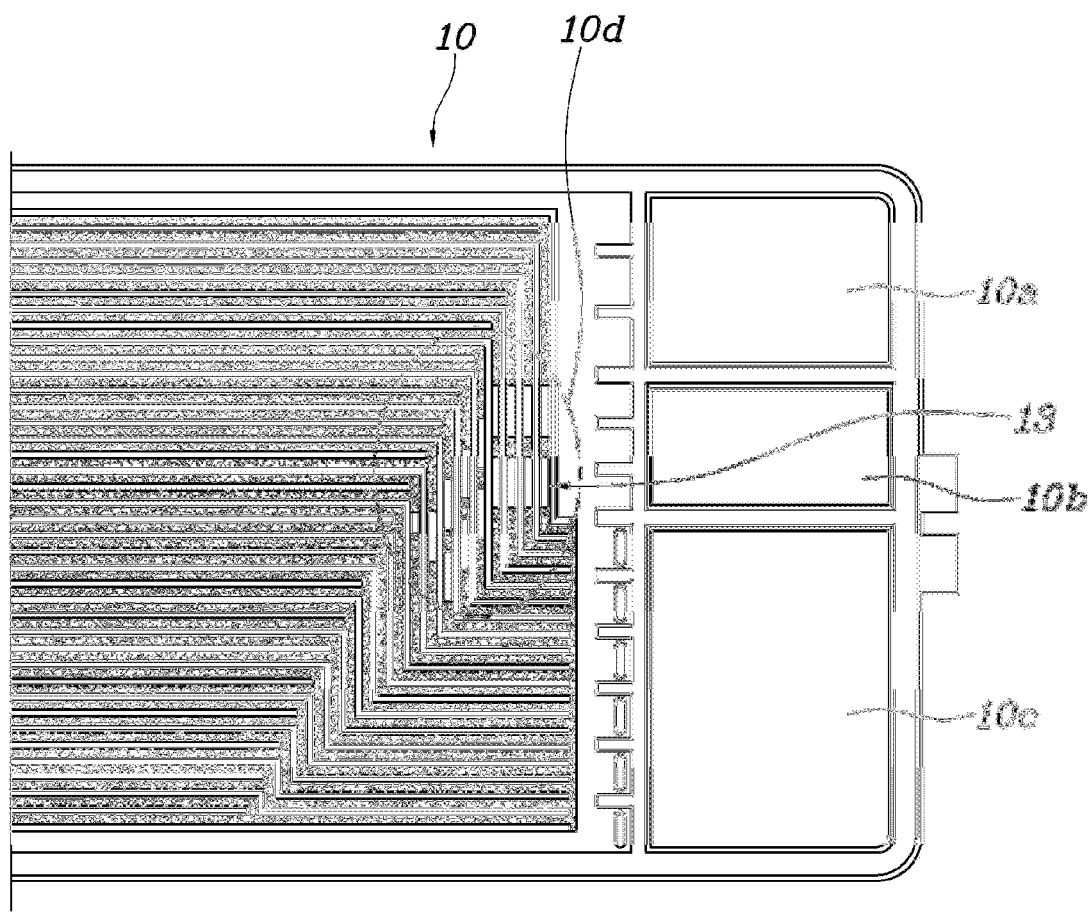
FIGS. 2 and 3 show a separator according to a related art.
Figure 3:
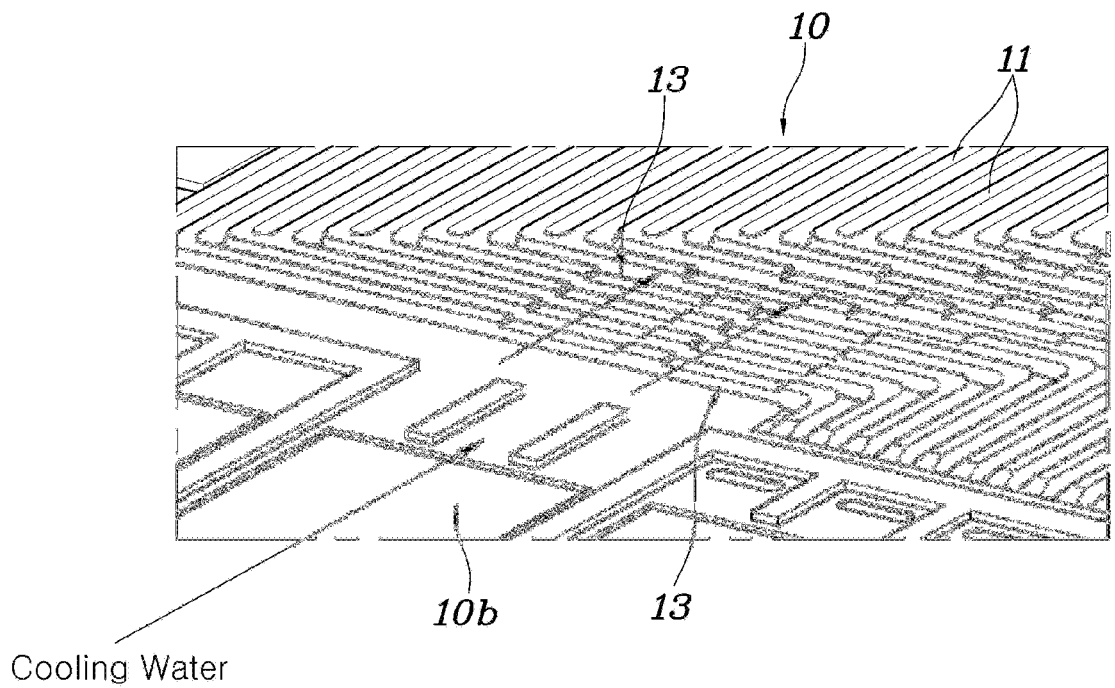

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to various exemplary embodiments of the present invention, specific examples of which are illustrated in the accompanying drawings and described below, since the exemplary embodiments of the present invention may be variously modified in many different forms. While the present invention will be described in conjunction with exemplary embodiments thereof, it is to be understood to those who skilled in the art that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims. Throughout the drawings, the same reference numerals will refer to the same or like parts.

Figure 4:
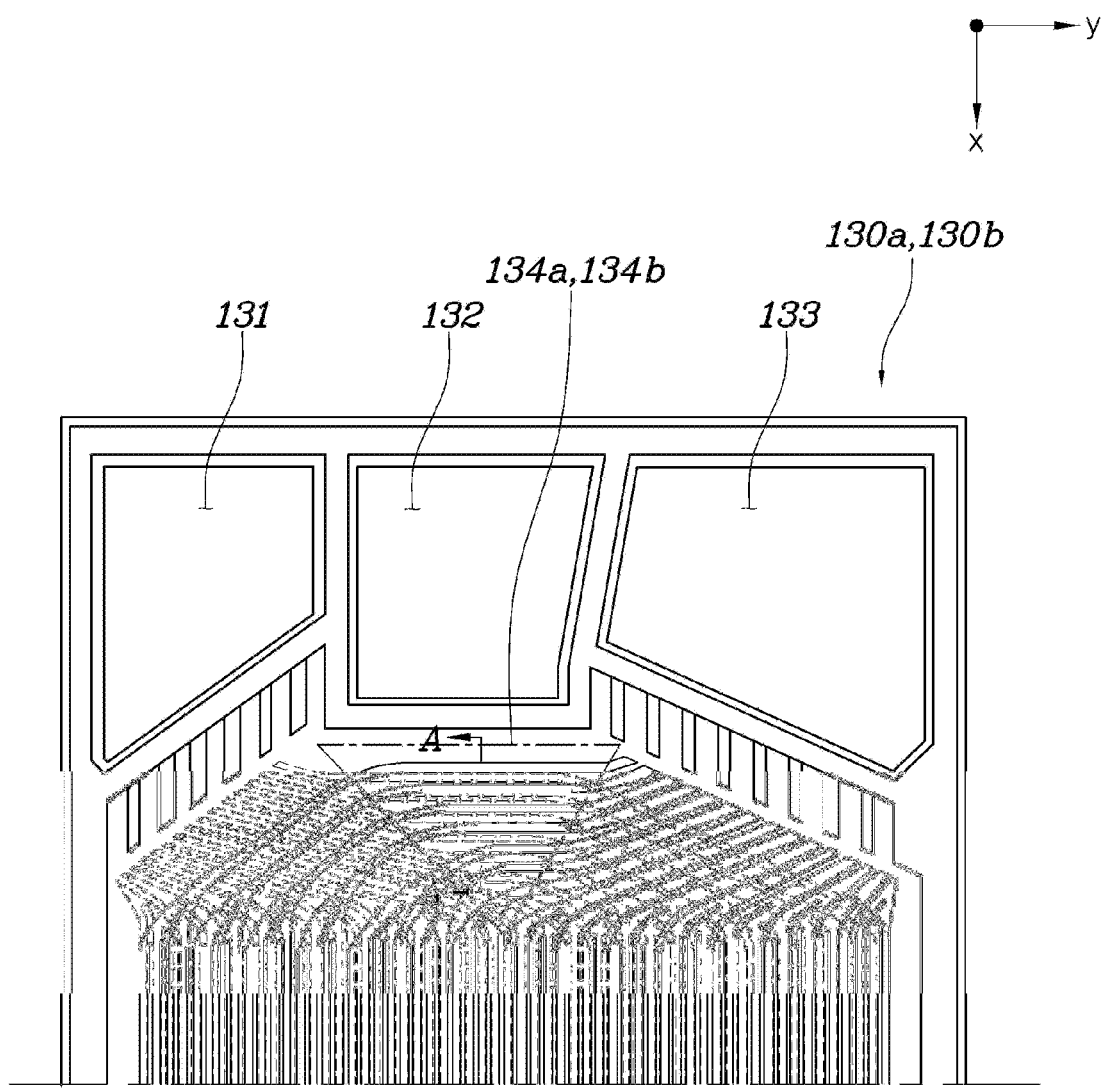
FIG. 4 shows a separator of a fuel cell stack according to an exemplary embodiment of the present invention.
Figure 5:
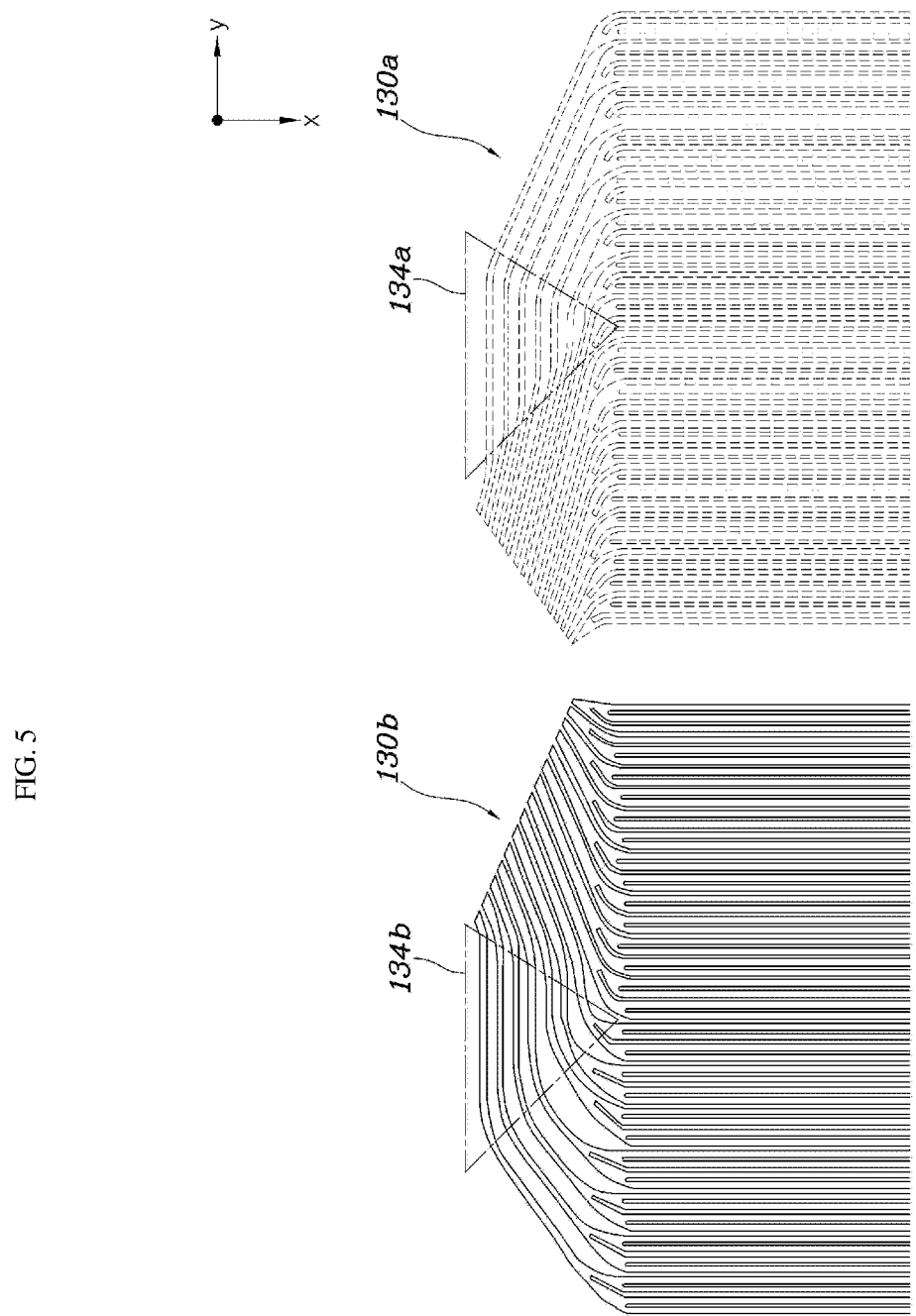
FIG. 5 shows a cooling water diffusion portion of a separator according to an exemplary embodiment of the present invention.
Figure 6:
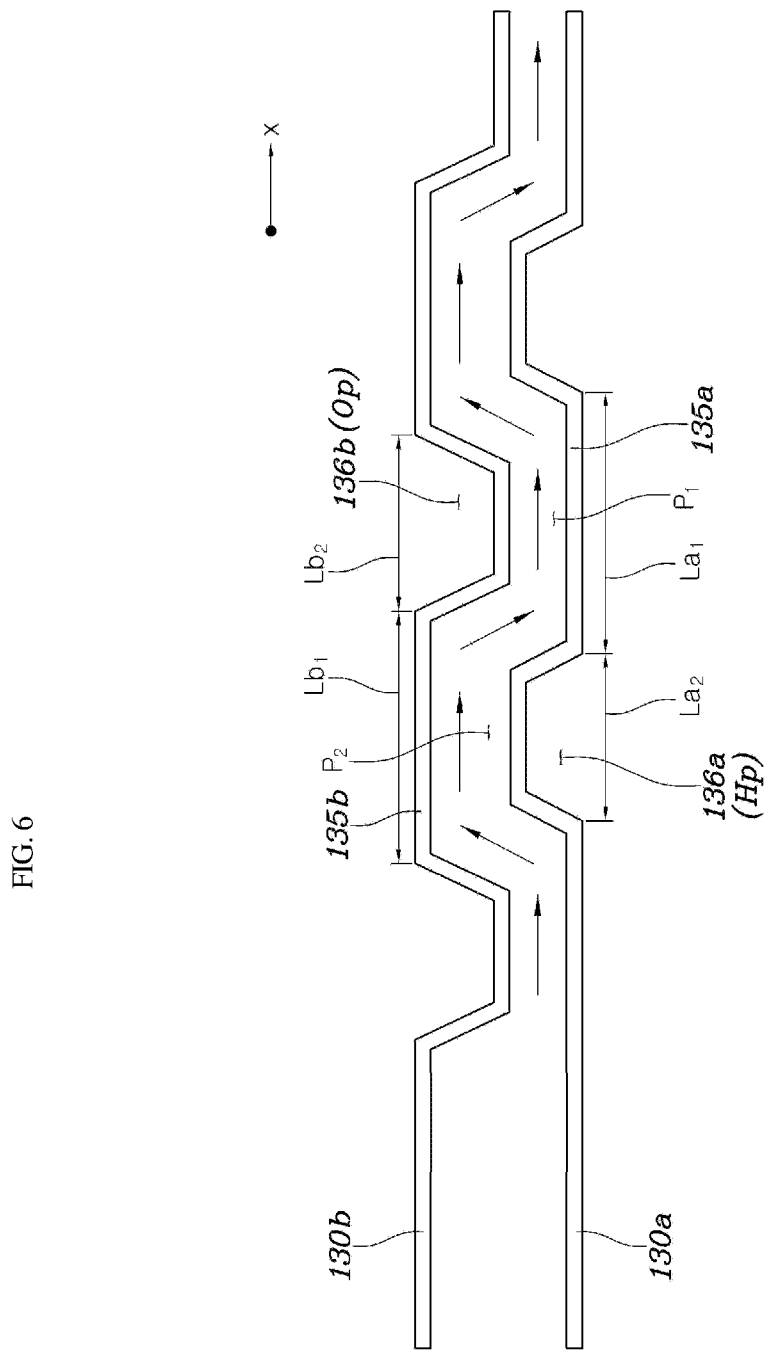
FIG. 6 is a cross-sectional view taken along the line A-A of FIG. 4 according to an exemplary embodiment of the present invention.

FIG. 4 shows a separator of a fuel cell stack according to an exemplary embodiment of the present invention; FIG. 5 shows a cooling water diffusion portion of the separator according to the exemplary embodiment of the present invention; and FIG. 6 is a cross-sectional view taken along the line A-A of FIG. 4. An objective of the fuel cell stack according to the exemplary embodiment of the present invention ensures and improves the flow of reactant gas and a coolant by improving a configuration of channel configured on the separator while maintaining a configuration of a conventional fuel cell stack shown in FIG. 1.

As shown in FIG. 1, the fuel cell stack according to the exemplary embodiment of the present invention is configured in a structure in which a plurality of unit cells are connected in series. The unit cell may include a membrane-electrode assembly (MEA) 110, a gas diffusion layer (GDL) 120, an anode separator 130a, and a cathode separator 130b. Particularly, the anode separator 130a included in a cell may be disposed to face the cathode separator 130b included in an adjacent cell, and the coolant may flow to a space defined by the anode separator 130a and the cathode separator 130b, which face each other in adjacent cells.

Further, each of the anode separator 130a and the cathode separator 130b may have a structure in which an associated one of lands 135a and 135b for support and an associated one of channels 136a and 136b for flow of fluids are formed to be repeated sequentially. In addition, each of the anode separator 130a and the cathode separator 130b may include inlet manifolds 131, 132, and 133 for introducing the reactant gas and the coolant, and outlet manifolds (not shown) at both edges thereof. For example, each one side of the anode separator 130a and the cathode separator 130b may include a hydrogen inlet manifold 131 introducing hydrogen, a cooling water inlet manifold 132 introducing cooling water, and an air inlet manifold 133 introducing air (oxygen), as shown in FIG. 4. In particular, cooling water diffusion portions 134a and 134b are provided to allow introduction of the cooling water introduced from the cooling water inlet manifold 132 into a space between the anode separator 130a and the cathode separator 130b to thus distribute the cooling water and diffuse the cooling water to a reaction surface.

The land 135a and channel 136a, which are formed on the cooling water diffusion portion 134a of the anode separator 130a, and the land 135b and channel 136b, which are formed on the cooling water diffusion portion 135b of the cathode separator 130b, may be formed to have a curved shape in a same direction as being spaced apart from each other, and may form a channel therebetween for flow of the cooling water. In particular, "curved shape" refers to a curved shape in the form of a sine wave. The curved shape is merely an approximate form of the sine wave, and parts of the anode separator 130a and the cathode separator 130 may be bent repeatedly in a concave-convex shape as shown in FIG. 4.

In particular, the land 135a formed on the cooling water diffusion portion 134a of the anode separator 130a and the channel 136b formed on the cooling water diffusion portion 134b of the cathode separator 130b may be grooved in a same direction. The land 135a formed on the cooling water diffusion portion 134a of the anode separator 130a and the channel 136b formed on the cooling water diffusion portion 134b of the cathode separator 130b may be spaced apart from each other at facing positions whereby the channel for flow of the cooling water may be disposed therebetween.

Similarly, the channel 136a formed on the cooling water diffusion portion 134a of the anode separator 130a and the land 135b formed on the cooling water diffusion portion 134b of the cathode separator 130b may be grooved in a same direction at facing positions. Particularly, the channel 136a formed on the cooling water diffusion portion 134a of the anode separator 130a and the land 135b formed on the cooling water diffusion portion 134b of the cathode separator 130b may be spaced apart from each other at facing positions whereby the channel for flow of the cooling water may be disposed therebetween. Therefore, as shown in FIG. 4, when the anode separator 130a and the cathode separator 130b are stacked, the respective cooling water diffusion portions 134a and 134b are overlapped each other, and the land 135a and channel 136a of the anode separator 130a and the channel 136b and land 135b of the cathode separator 130b are overlapped respectively. In addition, the anode separator 130a and the cathode separator 130b may remain separated from each other within an region where a first cooling water flow path area P1 and a second cooling water flow path area P2 are disposed.

In other words, the land 135a and the channel 136a may be arranged on the anode separator 130a alternately and repeatedly, and the land 135b and the channel 136b may be arranged on the cathode separator 130b in reverse order of the anode separator 130a. That is, the land 135a may alternate with the channel 136a in a repeated manner and the land 135b may alternate with the channel 136b in a repeated manner while in an opposite order from the anode separator 130a A space disposed between the land 135a provided on the cooling water diffusion portion 134a of the anode separator 130a and the channel 136b provided on the cooling water diffusion portion 134b of the cathode separator 130b and a space disposed between the channel 136a provided on the cooling water diffusion portion 134a of the anode separator 130a and the land 135b provided on the cooling water diffusion portion 134b of the cathode separator 130b may communicate with each other to provide the channel for the cooling water to flow through.

In particular, the first cooling water flow path area P1 may be formed between the land 135a provided on the cooling water diffusion portion 134a of the anode separator 130a and the channel 136b provided on the cooling water diffusion portion 134b of the cathode separator 130b. In addition, the second cooling water flow path area P2 may be formed between the channel 136a provided on the cooling water diffusion portion 134a of the anode separator 130a and the land 135b provided on the cooling water diffusion portion 134b of the cathode separator 130b. Accordingly, the first cooling water flow path area P1 and the second cooling water flow path area P2 may be formed to be parallel with each other within at least a part of the cooling water diffusion portions 134a and 134b. Thus, the first cooling water flow path area P1 and the second cooling water flow path area P2 may be formed to be parallel and communicate with each other to thus form the channel through which the cooling water may flow. At this point, the region where the first cooling water flow path area P1 and the second cooling water flow path area P2 are parallel with each other may be disposed near the cooling water manifold 132.

In addition, a hydrogen channel area Hp provided by the channel 136a of the anode separator 130a and an air channel area Op provided by the channel 136b of the cathode separator 130b may be formed to be parallel with the first cooling water flow path area P1 and the second cooling water flow path area P2 within the region where the first cooling water flow path area P1 and the second cooling water flow path area P2 may be formed to be parallel with each other. A width La1 of the land 135a formed on the cooling water diffusion portion 134a of the anode separator 130a and a width Lb1 of the land 135b formed on the cooling water diffusion portion 134b of the cathode separator 130b may be greater than a width La1 of the channel 136a formed on the cooling water diffusion portion 134a of the anode separator 130a and a width Lb2 of the channel 136b formed on the cooling water diffusion portion 134b of the cathode separator 130b to maintain a constant cross-sectional area of the channel through which the cooling water flows formed by communication of the first cooling water flow path area P1 and the second cooling water flow path area P2. In addition, the width La1 of the land 135a formed on the cooling water diffusion portion 134a of the anode separator 130a and the width Lb1 of the land 135b formed on the cooling water diffusion portion 134b of the cathode separator 130b may be equal to each other.

Moreover, the land 135a and the channel 136a, formed on the cooling water diffusion portion 134a of the anode separator 130a, and the land 135b and the channel 136b, formed on the cooling water diffusion portion 134b of the cathode separator 130b, may be formed to be parallel with each other in a y-direction perpendicular to an x-direction, which is a direction of a shortest distance between the cooling water manifold 132 and the reaction surface. Accordingly, the cooling water introduced from the cooling water manifold 132 may flow alternately through the land 135a and the channel 136a, formed on the cooling water diffusion portion 134a of the anode separator 130a, and the land 135b and the channel 136b, formed on the cooling water diffusion portion 134b of the cathode separator 130b. Then, the cooling water may flow toward the reaction surface in a longitudinal direction of the anode separator 130a and the cathode separator 130b, which is x-direction and the shortest distance between the cooling water manifold 132 and the reaction surface at the same time, while the cooling water is distributed in the y-direction perpendicular to the x-direction and thus, the cooling water may be distributed to entire reaction surface. Thus, unlike a related art, the present invention is capable of improving the flow of the cooling water without forming a stepped portion when forming the separator on the channel.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A fuel cell stack in which cooling water flows to a space defined by an anode separator and a cathode separator facing each other in adjacent cells, comprising:
    a cooling water diffusion portion provided on each of the anode separator and the cathode separator to introduce the cooling water from a cooling water manifold by distributing the cooling water on a reaction surface of the separators;
    a first cooling water flow path area disposed between a land formed on the cooling water diffusion portion of the anode separator and a channel formed on the cooling water diffusion portion of the cathode separator; and
    a second cooling water flow path area disposed between a channel formed on the cooling water diffusion portion of the anode separator and a land formed on the cooling water diffusion portion of the cathode separator,
    wherein the first cooling water flow path area and the second cooling water flow path area are parallel with each other and communicate with each other within at least a part of the cooling water diffusion portion, and
    wherein a width of each of the lands formed on the respective cooling water diffusion portions of the anode separator and the cathode separator is greater than a width of an associated one of the channels formed on the respective cooling water diffusion portions of the anode separator and the cathode separator.

2. The fuel cell stack of claim 1, wherein the land formed on the cooling water diffusion portion of the anode separator and the channel formed on the cooling water diffusion portion of the cathode separator are grooved in a same direction while being spaced apart from each other at facing positions.

3. The fuel cell stack of claim 1, wherein the channel formed on the cooling water diffusion portion of the anode separator and the land formed on the cooling water diffusion portion of the cathode separator are grooved in a same direction while being spaced apart from each other at facing positions.

4. The fuel cell stack of claim 1, wherein a width of the land formed on the cooling water diffusion portion of the anode separator and a width of the land formed on the cooling water diffusion portion of the cathode separator are equal to each other.

5. The fuel cell stack of claim 4, wherein a width of the channel formed on the cooling water diffusion portion of the anode separator and a width of the channel formed on the cooling water diffusion portion of the cathode separator are equal to each other.

6. The fuel cell stack of claim 1, wherein the land and the channel formed on the cooling water diffusion portion of the anode separator and the land and the channel formed on the cooling water diffusion portion of the cathode separator are parallel with each other in a direction perpendicular to a direction of a shortest distance between the cooling water manifold and the reaction surface.

7. The fuel cell stack of claim 1, wherein a hydrogen channel area provided by the channel of the anode separator and an air channel area provided by the channel of the cathode separator are parallel with the first cooling water flow path area and the second cooling water flow path area within a region where the first cooling water flow path area and the second cooling water flow path area are parallel with each other.

8. The fuel cell stack of claim 1, wherein a region where the first cooling water flow path area and the second cooling water flow path area are parallel with each other is disposed near the cooling water manifold.

9. The fuel cell stack of claim 1, wherein the anode separator and the cathode separator remain separated from each other at a region where the first cooling water flow path area and the second cooling water flow path area are disposed.

10. The fuel cell stack of claim 1, wherein the cooling water flowing toward the reaction surface from the cooling water manifold flows to the first cooling water flow path area and the second cooling water flow path area from the cooling water manifold in a longitudinal direction of the anode separator and the cathode separator.

* * * * *